(12) United States Patent
Tulloch et al.

(10) Patent No.: US 12,054,270 B2
(45) Date of Patent: Aug. 6, 2024

(54) AIRCRAFT ASSEMBLY

(71) Applicant: AIRBUS OPERATIONS LIMITED, Bristol (GB)

(72) Inventors: William Tulloch, Bristol (GB); Pat Broomfield, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 357 days.

(21) Appl. No.: 17/297,776

(22) PCT Filed: May 7, 2020

(86) PCT No.: PCT/EP2020/062673
§ 371 (c)(1),
(2) Date: May 27, 2021

(87) PCT Pub. No.: WO2020/229287
PCT Pub. Date: Nov. 19, 2020

(65) Prior Publication Data
US 2022/0194610 A1    Jun. 23, 2022

(30) Foreign Application Priority Data

May 10, 2019 (GB) .................................. 1906625

(51) Int. Cl.
*B64D 27/40* (2024.01)
*B64C 3/18* (2006.01)
(Continued)

(52) U.S. Cl.
CPC .............. *B64D 27/40* (2024.01); *B64C 3/185* (2013.01); *B64C 3/32* (2013.01); *B64D 27/18* (2013.01); *B64D 27/402* (2024.01)

(58) Field of Classification Search
CPC .. B64D 27/26; B64D 27/18; B64D 2027/264; B64C 3/185; B64C 3/32
See application file for complete search history.

(56) References Cited

U.S. PATENT DOCUMENTS 3,831,888 A    8/1974 Baker et al.
4,435,100 A  * 3/1984 Cox ...................... F16C 11/045
411/383

(Continued)

FOREIGN PATENT DOCUMENTS

EP    3 219 936    9/2017
EP    3 524 832    8/2019
(Continued)

OTHER PUBLICATIONS

European Search Report cited in EP 20 726 717.0 mailed Oct. 19, 2022, 4 pages.
(Continued)

*Primary Examiner* — Richard Green
*Assistant Examiner* — Steven J Shur
(74) *Attorney, Agent, or Firm* — Nixon & Vanderhye P.C.

(57) ABSTRACT

An aircraft assembly including: a first aircraft structure, a second aircraft structure, first and second tension bolts arranged to suspend the first aircraft structure below the second aircraft structure, the first and second tension bolts connected to the first aircraft structure such that an end of each of the tension bolts is accessible from respective outer surfaces of the first aircraft structure and first and second fail-safe mechanisms each associated with a respective one of the first and second tension bolts and arranged to suspend the first aircraft structure below the second aircraft structure responsive to failure of the respective tension bolt.

14 Claims, 6 Drawing Sheets

(51) Int. Cl.
B64C 3/32 (2006.01)
B64D 27/18 (2006.01)

(56) References Cited

U.S. PATENT DOCUMENTS

| | | | |
|---|---|---|---|
| 6,843,449 | B1 | 1/2005 | Manteiga et al. |
| 7,997,527 | B2* | 8/2011 | Lafont .................. B64D 27/18 |
| | | | 244/54 |
| 10,273,017 | B2* | 4/2019 | Wright .................. B64D 45/00 |
| 2008/0210821 | A1 | 9/2008 | Tanner et al. |
| 2010/0133376 | A1* | 6/2010 | Foyer ..................... B64D 27/26 |
| | | | 244/54 |
| 2010/0147996 | A1 | 6/2010 | Hartshorn et al. |
| 2012/0056033 | A1 | 3/2012 | Teulou et al. |

FOREIGN PATENT DOCUMENTS

| | | |
|---|---|---|
| EP | 3 696 089 | 8/2020 |
| FR | 2 891 243 | 3/2007 |
| RU | 1 637 186 | 1/1995 |
| WO | 2018/192787 | 10/2018 |

OTHER PUBLICATIONS

International Search Report for PCT/EP2020/062673, mailed Jul. 27, 2020, 3 pages.
Written Opinion of the ISA for PCT/EP2020/062673, mailed Jul. 27, 2020, 6 pages.
Combined Search and Examination Report for GB1906625.7, dated Oct. 18, 2019, 5 pages.

* cited by examiner

AIRCRAFT ASSEMBLY

RELATED APPLICATIONS

This application is the U.S. national phase of International Application PCT/EP2020/062673 filed May 7, 2020, which designated the U.S. and claims priority to United Kingdom Patent Application GB 1906625.7 filed May 10, 2019, the entire contents of each of which are hereby incorporated by reference.

TECHNICAL FIELD

The present invention relates to an aircraft assembly for connecting a first aircraft structure to a second aircraft structure, to an aircraft comprising such as assembly and to a method for connecting a first aircraft structure to a second aircraft structure.

BACKGROUND

In modern aircraft manufacturing there is a general desire to increase assembly speeds to increase aircraft production rates. Some aircraft joints, such a safety-critical joints, can be particularly complex and thus time-consuming to assemble and may limit the total number of aircraft that can be produced. In safety-critical joints, tolerances may be tighter than in other aircraft assemblies and aligning different connection points may therefore be more difficult and may even require slight modification to each aircraft to achieve the required fit.

Most conventional aircraft have engines mounted to the wings by engine mounting pylons. For commercial airliners there is a trend toward higher bypass ratio engines, which have larger diameters than lower bypass ratio engines. To accommodate large diameter engines whilst maintaining sufficient clearance between the engine and the ground it is desirable to minimize the vertical distance between the top of the engine and the lower surface of the wing. Conventionally, an engine mounting pylon is attached to a wing box by a set of couplings interposed vertically between the wing box and the primary structure of the pylon. These couplings transmit forces between the engine mounting pylon and the wing box, including the thrust loads generated by the engine. Known designs of such couplings require the top surface of the engine mounting pylon to be spaced apart vertically from the lower surface of the wing box and therefore may not be suitable for use with very large diameter engines.

SUMMARY

A first aspect of the present invention provides an aircraft assembly comprising: a first aircraft structure, a second aircraft structure, first and second tension bolts arranged to suspend the first aircraft structure below the second aircraft structure, the first and second tension bolts connected to the first aircraft structure such that an end of each of the tension bolts is accessible from respective outer surfaces of the first aircraft structure and first and second fail-safe mechanisms each associated with a respective one of the first and second tension bolts and arranged to suspend the first aircraft structure below the second aircraft structure responsive to failure of the respective tension bolt.

Optionally, the first and second fail-safe mechanisms are arranged not to suspend the first aircraft structure below the second aircraft structure when there is no failure of the respective tension bolt.

Optionally, the first and second tension bolts are connected to the first aircraft structure via flanges on the respective outer surfaces of first aircraft structure.

Optionally, the first and second tension bolts each comprise a head, a shaft and a retaining nut, and the first and second tension bolts are each arranged such that the retaining nut is at the end of tension bolt that is accessible from the respective outer surface of the first aircraft structure.

Optionally, the assembly comprises first and second shear attachments connecting the first and second aircraft structures, wherein the shear attachments are arranged to receive a primary load in a shear direction.

Optionally, the first aircraft structure is an engine mounting pylon and the second aircraft structure is a wing box comprising a front spar, and the first and second tension bolts connect the engine mounting pylon to the front spar.

Optionally, the at least one of the first and second fail-safe mechanisms comprises a fail-safe fastener arranged in a parallel direction to the respective tension bolt.

Optionally, the fail-safe fastener is rotatable about a longitudinal axis of the fail-safe fastener when the respective tension bolt is in use.

Optionally, the fail-safe fastener is separated from the respective tension bolt by a separating structure.

Optionally, the fail-safe fastener extends through a central bore of the respective tension bolt.

Optionally, the assembly comprises a structural health monitoring system associated with each of the first and second tension bolts.

A second aspect of the present invention provides an aircraft assembly comprising: an engine mounting pylon for attaching an aircraft engine to an aircraft wing, a wing box, first and second tension bolts connecting the engine mounting pylon to the wing box in tension, wherein an end of each of the tension bolts is accessible from a respective external surface of the engine mounting pylon, and first and second fail-safe arrangements each associated with a respective one of the tension bolts and arranged to support the engine mounting pylon relative to the wing box responsive to failure of the respective tension bolt.

A third aspect of the present invention provides a method of mounting an engine mounting pylon to a wing box of an aircraft wing, the method comprising: attaching the engine mounting pylon to the wing box with first and second shear attachments, connecting the engine mounting pylon to the wing box with first and second tension bolts arranged such that an end of each of the tension bolts is accessible from a respective external surface of the engine mounting pylon, and an opposing end of each tension bolt is held captive in the wing box, connecting the engine mounting pylon to the wing box with first and second fail-safe mechanisms such that the fail-safe mechanisms are arranged to support the engine mounting pylon relative to the wing box responsive to failure of the respective one of the first and second tension bolts, and tensioning the first and second tension bolts to a predetermined tension by applying a tensioning force to the ends of each of the tension bolts that are accessible from the respective external surfaces of the engine mounting pylon.

A fourth aspect of the present invention provides an aircraft comprising an aircraft assembly according to a first or second aspect of the present invention.

BRIEF DESCRIPTION OF THE DRAWINGS

Embodiments of the invention will now be described, by way of example only, with reference to the accompanying drawings, in which.

DETAILED DESCRIPTION

In general, a shear connection between two structures requires a low clearance fit between a connecting fastener and the hole into which the fastener is inserted. The low clearance fit helps to ensure engagement between the sides of the fastener and the hole, which may help to reduce damage to the components by minimising vibration and point loads on the fastener. Therefore, connecting two structures with a plurality of shear connections can be difficult due to there being a plurality of low clearance fits that must each be aligned. Conversely, a tension connection between two structures can be formed with a comparatively higher clearance fit because the connection does not experience shear (side) loads. Replacing a shear connection with a tension connection may help to reduce the difficulty of connecting two structures due to the higher clearance fit that can accommodate more tolerance variation than a low clearance fit of a shear connection.

One safety-critical joint in an aircraft is the connection between an aircraft wing and an engine mounting pylon. An aircraft engine is suspended below the aircraft wing by the engine mounting pylon. Typically, an engine mounting pylon is connected to an aircraft wing by a plurality of shear connections, meaning that assembly can be time-consuming as well as costly, due to the need for complex tooling.

The examples described below each relate to an aircraft assembly for connecting a first aircraft structure to a second aircraft structure. The aircraft assembly may be suitable for a safety-critical aircraft joint, such as a joint between an engine mounting pylon and a wing box of an aircraft wing. An engine mounting pylon may generally be attached to a wing box by a forward coupling and an aft coupling. The example aircraft assembly according to the invention may be especially suitable for use as part of a forward coupling between an engine mounting pylon and a wing box. The forward coupling between an engine mounting pylon and a wing box supports the weight of the pylon and may also transmit thrust from the engine to the wing. For the purposes of this specification, the terms forward and rearward (or aftward), up, down and the like are defined with respect to a normal operational orientation of the structures referred to; for aircraft structures this will be the normal direction of travel of the aircraft during flight.

Figure 1:
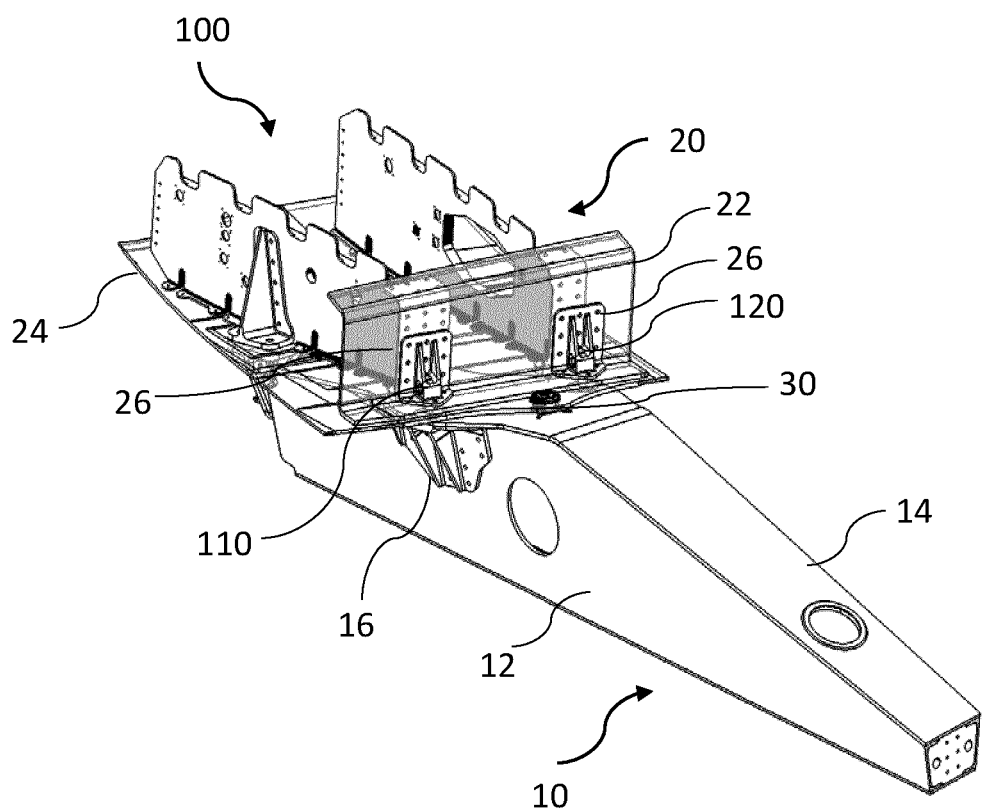
FIG. 1 shows a schematic view of an aircraft assembly according to an example of the invention.

FIG. 1 shows an isometric view of an example aircraft assembly 100 according to an embodiment. The aircraft assembly 100 comprises a first aircraft structure 10, which in this example is an engine mounting pylon, and a second aircraft structure 20, which in this example is a wing box of an aircraft wing. In this example, the second aircraft structure 20 comprises a front spar 22 and a lower cover 24. In other examples, the first and second aircraft structures 10, 20 may be other than an engine mounting pylon and a wing box.

The aircraft assembly 100 further comprises first and second tension bolts 110, 120 arranged to suspend the first aircraft structure 10 below the second aircraft structure 20. In this example, the tension bolts 110, 120 pass through the front spar 22 and the lower cover 24 to connect the engine mounting pylon to the front spar of the wing box. The tension bolts 110, 120 are arranged such that the weight of the first aircraft structure 10 is taken by the tension bolts 110, 120 in a direction that is substantially parallel to a longitudinal axis of the tension bolts 110, 120. The tension bolts 110, 120 therefore experience substantially zero shear forces and can be arranged in position with a high clearance fit.

The first and second tension bolts 110, 120 are connected to the first aircraft structure 10 such that an end of each of the tension bolts 110, 120 is accessible from respective outer surfaces 12, 14 of the first aircraft structure 10. Typically, an engine mounting pylon and a wing box encase various aircraft systems such that access to the inside of the engine mounting pylon and the wing box can be restricted, making it difficult to align, connect and tighten fasteners positioned within the engine mounting pylon and the wing box. It is therefore advantageous for ease of assembly for an end of each of the tension bolts 110, 120 to be accessible from an outer (external) surface 12, 14 of the first aircraft structure 10. In the example shown in FIG. 1, the tension bolts 110, 120 are connected to the first aircraft structure 10 via flanges 16 (only one is visible in FIG. 1) on the respective outer surfaces 12, 14 of first aircraft structure 10. The flanges 16 house the end of the respective tension bolt 110, 120 that is accessible from respective outer surface 12, 14 of the first aircraft structure 10. The flange 16 may be integral to the first aircraft structure 10 or may be connectable to the first aircraft structure 10, for example by a plurality of fasteners.

Figure 2A:
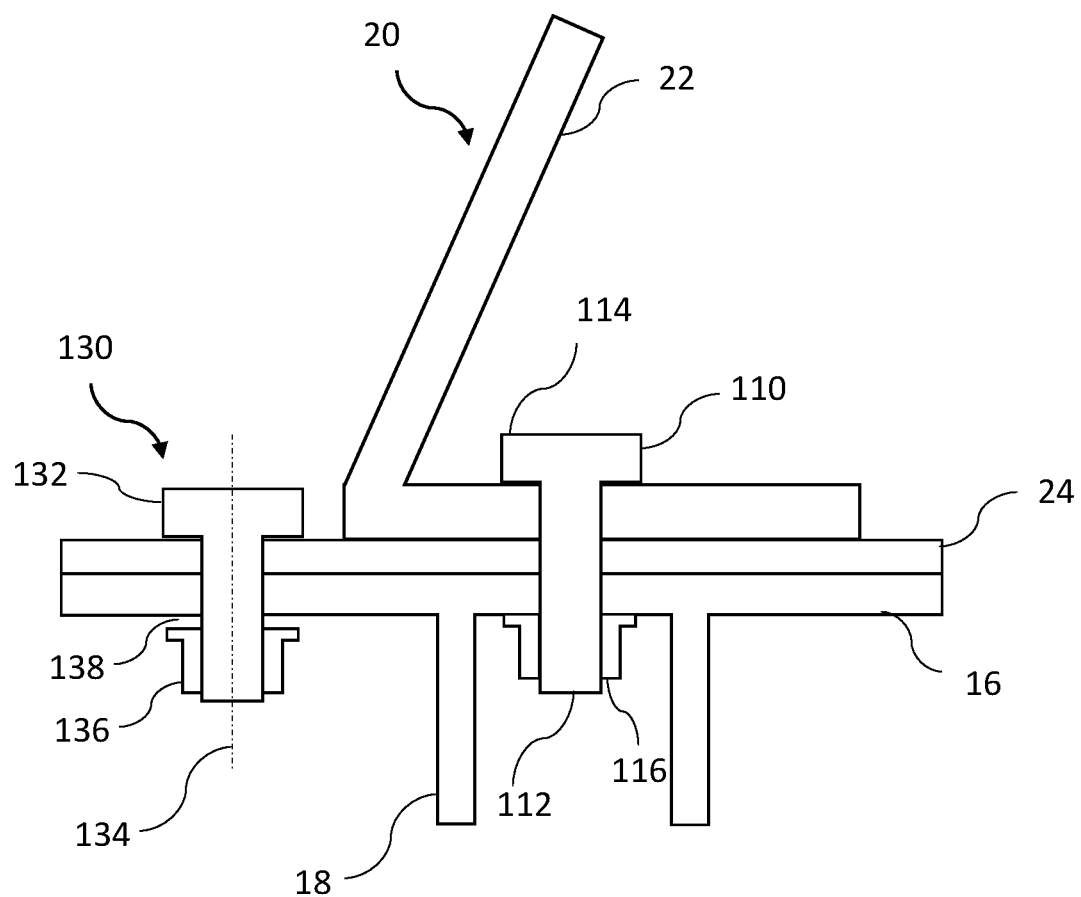
FIGS. 2a and 2b show cross-sectional views of a portion of an aircraft assembly according to examples of the invention.
Figure 2B:
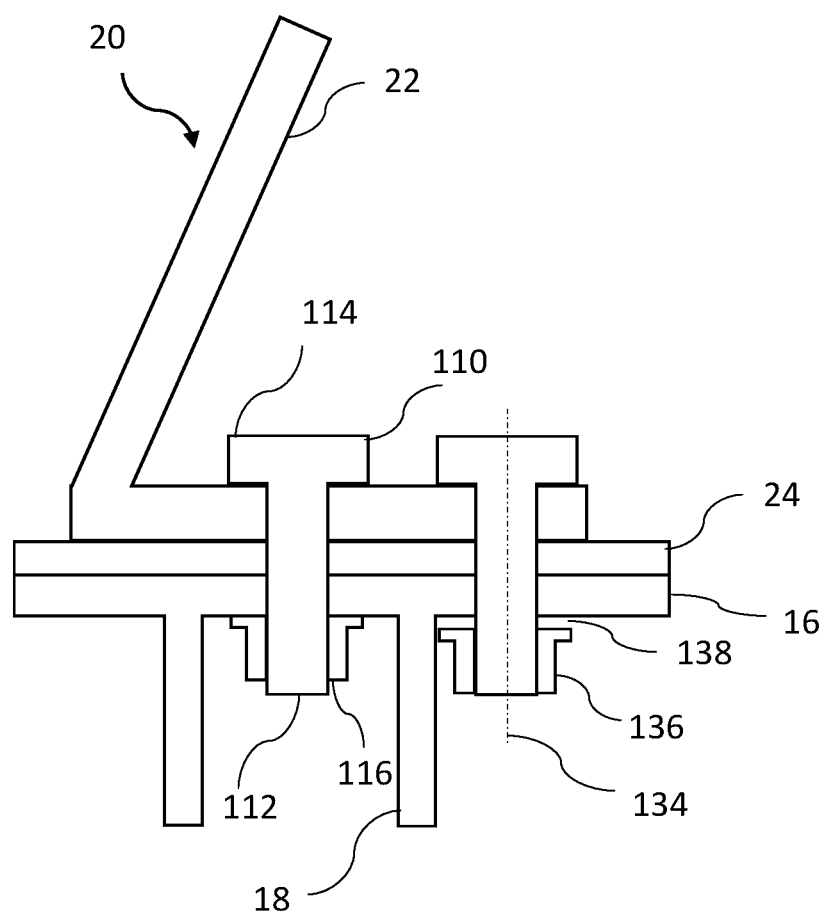
Figure 3:
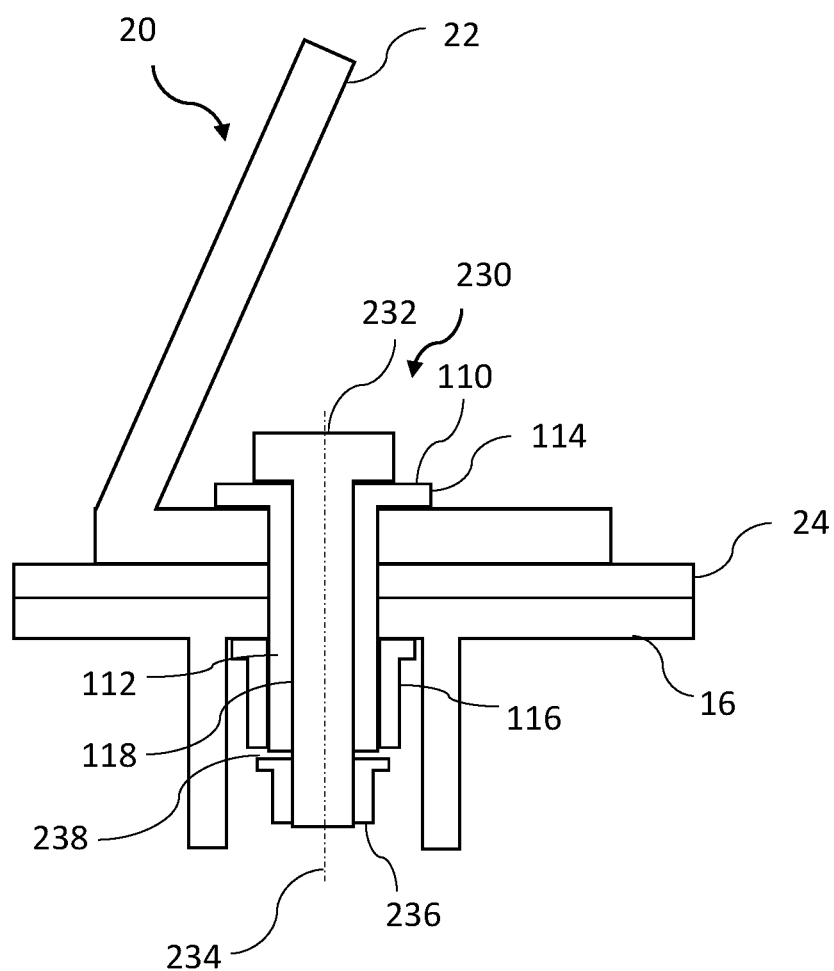
FIG. 3 shows a cross-sectional view of a portion of an aircraft assembly according to an example of the invention.

In some examples, the first and second tension bolts 110, 120 each comprise a head, a shaft and a retaining nut (as best shown in FIGS. 2a, 2b and 3). In these examples, the first and second tension bolts 110, 120 may be arranged such that the retaining nut is at the end of the tension bolt 110, 120 that is accessible from the respective outer surface 12, 14 of the first aircraft structure 10. Such an arrangement of the tension bolts 110, 120 allows each of the tension bolts 110, 120 to be tensioned at their respective nut from a position external to the first and second aircraft structures 10, 20 thus permitting easier access for tensioning the tension bolts 110, 120 compared to if the nuts were positioned within the second aircraft structure 20. A further advantage of inserting and tensioning the tension bolts 110, 120 from below the first and second aircraft structures 10, 20 is that systems can be installed into the second aircraft structure 20 and fully tested, before the first aircraft structure 10 is joined to the second aircraft structure 20. This is because minimal or no access is required to the second aircraft structure 20 side of the coupling during the joining process. This may significantly simplify and speed-up construction of the aircraft.

In some examples, such as that shown in FIG. 1, the head of each tension bolt 110, 120 is held captive in a respective fitting 26 connected to the second aircraft structure 20. The fittings 26 may help to enable the tension bolts 110, 120 to be inserted and tensioned from below the first and second aircraft structures 10, 20 by rigidly holding the tension bolts 110, 120 in position.

The aircraft assembly 100 further comprises first and second fail-safe mechanisms (embodiments of which are shown in more detail in FIGS. 2a, 2b and 3) each associated with a respective one of the first and second tension bolts 110, 120 and arranged to suspend the first aircraft structure 10 below the second aircraft structure 20 responsive to failure of the respective tension bolt 110, 120. In this example, the first and second fail-safe mechanisms are arranged not to suspend the first aircraft structure 10 below the second aircraft structure 20 when there is no failure of the respective tension bolt 110, 120. That is, the first and second fail-safe mechanisms experience substantially zero tension force when the respective tension bolt 110, 120 is intact and performing correctly. The provision of two tension bolts 110, 120 each with a fail-safe mechanism represents a reduction in the number of connections between the first and second aircraft structures 10, 20 compared to connection arrangements known in the art. A reduced number of connections, in particular the provision of tension connections, can help to reduce assembly time.

In summary, the first and second tension bolts 110, 120 provide a primary load path between the first and second aircraft structures 10, 20, and the fail-safe mechanisms provide a secondary load path between the first and second aircraft structures 10, 20. The secondary load path is for use in the event that load cannot be transferred via the primary load path.

In some examples, the aircraft assembly 100 comprises first and second shear attachments connecting the first and second aircraft structures 10, 20. The shear attachments are arranged to receive a primary load in a shear direction. In the example of in FIG. 1, the tension bolts 110, 120 and the fail-safe mechanisms are comprised in a forward coupling between the first and second aircraft structures 10, 20. Also comprised in the forward coupling is a first shear attachment, which in this example is a thrust spigot 30, as known in the art, arranged in use to transmit thrust from the engine to the aircraft wing. In the example of FIG. 1, the aircraft assembly 100 comprises an aft coupling (not shown) which comprises the second shear attachment. The aft coupling may be known as an aft pick-up and is positioned rearward of the first coupling. The aft coupling may be configured to transfer vertical and lateral loads between the first aircraft structure 10 to the second aircraft structure 20. Such an arrangement helps to ensure that the aircraft assembly 100 can transfer load from the first aircraft structure 10 to the second aircraft structure 20 in all directions.

In some examples, the aircraft assembly 100 may comprise a structural health monitoring system (SHMS) (not shown) associated with each of the first and second tension bolts 110, 120. The SHMS may be configured to detect the tension in each of the first and second tension bolts 110, 120 to identify a potential failure in the aircraft assembly 100. The SHMS may provide the advantage that a potential failure may be communicated to aircraft or ground crew so that corrective action can be taken, rather than a failure not being noticed until a routine inspection is performed. In some examples, the aircraft assembly 100 may comprise a SHMS associated with each of the first and second fail-safe mechanisms and arranged to detect tension in the fail-safe mechanisms.

FIGS. 2a, 2b and 3 show cross-sectional views of a portion of example aircraft assemblies according to the invention. FIGS. 2a, 2b and 3 show a second aircraft structure 20 comprising a front spar 22 and a lower cover 24, a flange 16 attached to a first aircraft structure (not shown), a first tension bolt 110 and a fail-safe mechanism 130, 230. In these examples, a shaft 112 of the tension bolt 110 passes through a hole in each of the front spar 22, lower cover 24 and the flange 16 with a high clearance fit. A head 114 of the tension bolt 110 engages with the front spar 22. A nut 116 of the tension bolt 110 is tensioned to a predetermined tension value such that the nut 116 abuts the flange 16. In other examples, such as when the head 114 of the tension bolt 110 is held captive in a fitting 26, as described with reference to FIG. 1, the head 114 may engage with the fitting 26 rather than directly with the front spar 22.

In each of the examples shown in FIGS. 2a, 2b and 3, the fail-safe mechanism 130, 230 comprises a fail-safe fastener 132, 232 arranged in a parallel direction to the tension bolt 110. The parallel arrangement of the fail-safe fastener 132, 232 and the tension bolt 110 ensures that, in the event that the fail-safe fastener 132, 232 transfers a tension load that would otherwise have been taken by the tension bolt 110 from the first aircraft structure 10 to the second aircraft structure 20, the direction of the tension load is not altered and thus a minimal change in loading to the second aircraft structure 20 is experienced. The fail-safe fastener 132, 232 may, for example, be a bolt or a stud. Since the fail-safe mechanism 130, 230 is a tension connection, a high clearance fit may be used, as with the tension bolt 110.

In some examples, the fail-safe fastener 132, 232 is rotatable about a longitudinal axis 134, 234 of the fail-safe fastener 132, 232 when the respective tension bolt 110 is in use. That is, under normal operation, in which the tension bolt 110 is performing correctly, the fail-safe fastener 132, 232 experiences substantially no tension forces such that the fail-safe fastener 132, 232 is freely rotatable. Such an arrangement may allow simple inspection of the integrity of the tension bolt 110 since maintenance crew can manually rotate the fail-safe fastener 132, 232 to verify that no tension force is passing through the fail-safe fastener 132, 232 and thus tension force is being taken by the tension bolt 110.

Preferably, and as shown in FIGS. 2a, 2b and 3, a nut 136, 236 end of the fail-safe fastener 132, 232 is accessible from the same outer surface of the first aircraft structure 10 as the end of the respective tension bolt 110 that is accessible from the outer surface of the first aircraft structure 10. This can be advantageous for ease of assembly, as discussed. In other examples, the fail-safe fastener 132, 232 may be oriented in an opposite direction to that shown in FIGS. 2a, 2b and 3, such that a nut end of the fail-safe fastener 132, 232 is located within the second aircraft structure 20 rather than on an outer surface of the first aircraft structure 10.

In the example shown in FIGS. 2a and 2b, the fail-safe fastener 132 is separated from the tension bolt 110 by a separating structure 18 in the form of a wall between the tension bolt 110 and the fail-safe fastener 132. In these examples, the separating structure 18 is integral to the flange 16. Whilst the fail-safe fastener 132 is arranged to transfer load from a first aircraft structure to a second aircraft structure in the event of failure of the tension bolt 110, separation of the tension bolt 110 and the fail-safe fastener 132 may help the fail-safe fastener 132 to also transfer load from the first aircraft structure 10 to the second aircraft structure 20 in the event of a change in a structure surrounding the tension bolt 110 that causes the tension bolt 110 to no longer be able to transfer load from the first aircraft structure 10 to the second aircraft structure 20. For example, damage to the front spar 22, lower cover 24 or flange 16 may result in warping at the aircraft joint, which may cause a reduction in the load transferred by the tension bolt 110.

In the example shown in FIG. 2a, the fail-safe fastener 132 is positioned on the opposite side of the front spar 22 compared to the tension bolt 110 such that the fail-safe fastener 132 passes through the lower cover 24 and the flange 16. In the example shown in FIG. 2b, the fail-safe fastener 132 is positioned on the same side of the front spar 22 as the tension bolt 110. This arrangement may help to further decrease assembly time for an aircraft joint.

In the example shown in FIGS. 2a and 2b, the nut 136 of the fail-safe fastener 132 is positioned with a gap 138 between the flange 16 and the nut 136. Such a gap 138 can help to ensure that the fail-safe fastener 132 transfers substantially no load between the first and second aircraft structures 10, 20 when the tension bolt 110 is performing correctly.

In the example shown in FIG. 3, the fail-safe fastener 232 extends through a central bore 118 of the tension bolt 110. The fail-safe fastener 232 may be positioned within the central bore 118 with a lower clearance fit than the clearance fit of the tension bolt 110 in the first and second aircraft structures 10, 20. The fail-safe fastener 232 is longer than the tension bolt 110 such that the fail-safe fastener 232 extends beyond the shaft 112 of the tension bolt 110. Such an arrangement is very compact and space-efficient. Further, only a single hole is required in the front spar 22, lower cover 24 and the flange 16 for the tension bolt 110 and the fail-safe mechanism 130. In addition, in the event that the fail-safe fastener 232 is required to transfer force between the first and second aircraft structures 10, 20, the load path in the first and second aircraft structure 10, 20 is the same as if the force were transferred by the tension bolt 110.

In the example shown in FIG. 3, the nut 236 of the fail-safe fastener 232 is positioned with a gap 238 between the shaft 112 of the tension bolt 110 and the nut 236 of the fail-safe fastener 232. Such a gap 238 can help to ensure that the fail-safe fastener 132 transfers substantially no load between the first and second aircraft structures 10, 20 when the tension bolt 110 is performing correctly.

In embodiments of the present invention, the tension bolts 110 and/or the fail-safe mechanisms 130, 230 may be locked with double-locking features in addition to being tensioned to a predetermined tension value. A double-locking feature may comprise deformation features, adhesive and mechanical locking.

Figure 4:
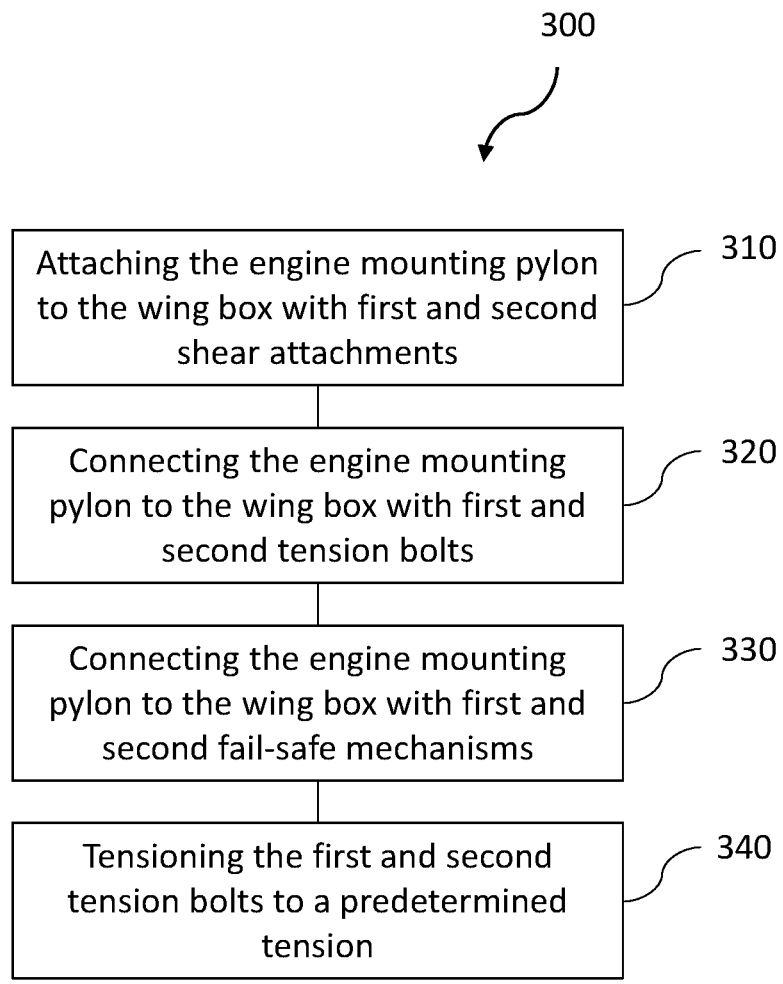
FIG. 4 is a flow chart illustrating an example method of attaching an engine mounting pylon to a wing box of an aircraft wing.

FIG. 4 shows a method 300 of mounting an engine mounting pylon to a wing box of an aircraft wing according to an example of the invention. The engine mounting pylon and wing box may be as shown in the example in FIG. 1. The method 300 comprises attaching the engine mounting pylon to the wing box with first and second shear attachments (block 310). For example, the first shear attachment may be a thrust spigot 30 and the second shear attachment may be an aft pick-up as described with reference to FIG. 1.

The method 300 further comprises connecting the engine mounting pylon to the wing box with first and second tension bolts arranged such that an end of each of the tension bolts is accessible from a respective external surface of the engine mounting pylon, and an opposing end of each tension bolt is held captive in the wing box (block 320). The tension bolts may be the tension bolts 110, 120 as described with reference to FIGS. 1-3 and the external surfaces may be outer surfaces 12, 14 shown in FIG. 1. The tension bolts may be connected with a higher clearance fit than the first and second shear attachments.

The method 300 further comprises connecting the engine mounting pylon to the wing box with first and second fail-safe mechanisms such that the fail-safe mechanisms are arranged to support the engine mounting pylon relative to the wing box responsive to failure of the respective one of the first and second tension bolts (block 330). The fail-safe mechanisms may be the fail-safe mechanisms 130, 230 described with reference to FIGS. 2a, 2b and 3. The method may further comprise tightening the fail-safe mechanisms such that they can transfer force from the engine mounting pylon to the wing box in the event that the respective tension bolt cannot transfer force from the engine mounting pylon to the wing box.

The method 300 further comprises tensioning the first and second tension bolts to a predetermined tension by applying a tensioning force to the ends of each of the tension bolts that are accessible from the respective external surfaces of the engine mounting pylon (block 340). Preferably, the nut end of each of the tension bolts is accessible from the respective external surface of the engine mounting pylon to enable easy access for tensioning the tension bolts during assembly.

Figure 5:
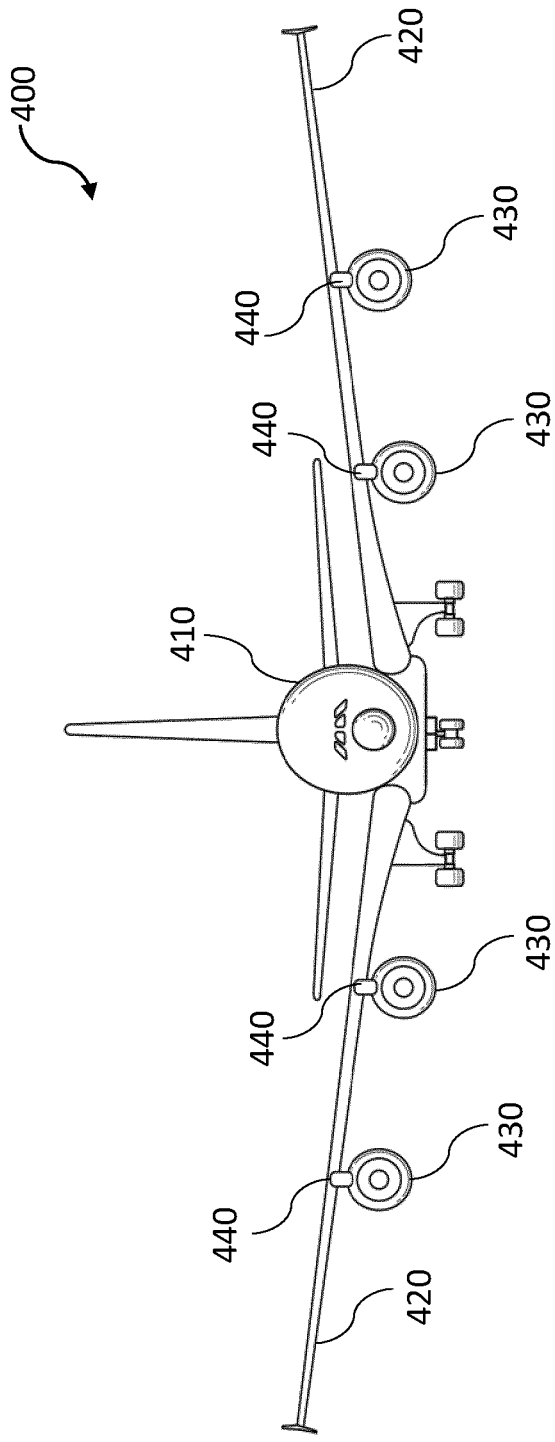
FIG. 5 is a front view of an aircraft according to an example of the invention.

FIG. 5 shows a schematic front view of an aircraft 400 according to an example of the invention. The aircraft 400 comprises a fuselage 410, wings 420 on either side of the fuselage 410 and two engines 430 mounted beneath each of the wings 420 via respective aircraft assemblies 440 according to the invention, such as the assemblies 100 described with reference to FIGS. 1-3.

It is to be noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:

1. An aircraft assembly in an aircraft, the aircraft assembly comprising:
   a mount for an aircraft engine;
   a wing;
   first and second tension bolts arranged to suspend the mount below the wing, the first and second tension bolts connected to the wing such that a lower end of each of the first and second tension bolts extend below a lower surface of the wing and are accessible from respective outer surfaces of the mount and the wing, wherein the first and second tension bolts each include a longitudinal axis oriented substantially vertically while the aircraft is on ground and the first and second tension bolts extend downward through the lower surface of the wing; and
   first and second fail-safe mechanisms each associated with a respective one of the first and second tension bolts and arranged to suspend the mount below the wing responsive to failure of a respective first or second tension bolt.

2. The aircraft assembly according to claim 1, wherein the first and second fail-safe mechanisms are arranged not to suspend the mount below the wing when there is no failure of the respective first or second tension bolt.

3. The aircraft assembly according to claim 1, wherein the first and second tension bolts are connected to the mount via flanges on the outer surfaces of mount.

4. The aircraft assembly according to claim 1, wherein the first and second tension bolts each comprise a head, a shaft and a retaining nut, and
   wherein the first and second tension bolts are each arranged such that the retaining nut is at the lower end of the respective first or second tension bolt that is accessible from the respective outer surface of the mount.

5. The aircraft assembly according to claim 1, comprising first and second shear attachments connecting the mount and the wing, wherein the shear attachments are arranged to receive a primary load in a shear direction.

6. The aircraft assembly according to claim 1, wherein the mount is an engine mounting pylon and the wing includes a wing box comprising a front spar, and
wherein the first and second tension bolts connect the engine mounting pylon to the front spar.

7. The aircraft assembly according to claim 1, wherein the at least one of the first and second fail-safe mechanisms comprises a fail-safe fastener arranged in a parallel direction to the longitudinal axis of the respective first or second tension bolt.

8. The aircraft assembly according to claim 7, wherein the fail-safe fastener is rotatable about a longitudinal axis of the fail-safe fastener when the respective first or second tension bolt is in use.

9. The aircraft assembly according to claim 7, wherein the fail-safe fastener is separated from the respective first or second tension bolt by a separating structure.

10. The aircraft assembly according to claim 7, wherein the fail-safe fastener extends through a central bore of the respective first or second tension bolt.

11. The aircraft assembly according to claim 1, comprising a structural health monitoring system associated with each of the first and second tension bolts.

12. An aircraft comprising an aircraft assembly according to claim 1.

13. An aircraft assembly of an aircraft, the aircraft assembly comprising:
an engine mounting pylon configured to attach an aircraft engine to an aircraft wing;
a wing box;
first and second tension bolts connecting the engine mounting pylon to the wing box in tension, wherein a lower end of each of the first and second tension bolts are below a lower surface of the wing box and are accessible from external surfaces of the engine mounting pylon, wherein the first and second tension bolts each include a longitudinal axis oriented substantially vertically while the aircraft is on ground and the first and second tension bolts extend downward through the lower surface of the wing box, and
first and second fail-safe arrangements each associated with a respective one of the first or second tension bolts, and arranged to support the engine mounting pylon relative to the wing box responsive to failure of the respective first or second tension bolt.

14. A method of mounting an engine mounting pylon to a wing box of an aircraft wing on an aircraft, the method comprising:
attaching the engine mounting pylon to the wing box with first and second shear attachments;
connecting the engine mounting pylon to the wing box with first and second tension bolts arranged such that a lower end of each of the first and second tension bolts are below a lower surface of the wing box and are accessible from external surfaces of the engine mounting pylon, and an upper end of each of the first and second tension bolts is held captive in the wing box, wherein the first and second tension bolts each include a longitudinal axis oriented substantially vertically while the aircraft is on ground and the first and second tension bolts extend downward through the lower surface of the wing box;
connecting the engine mounting pylon to the wing box with first and second fail-safe mechanisms such that the fail-safe mechanisms are arranged to support the engine mounting pylon relative to the wing box responsive to failure of a respective one of the first and second tension bolts; and
tensioning the first and second tension bolts to a predetermined tension by applying a tensioning force to an end of each of the tension bolts accessible from the respective external surfaces of the engine mounting pylon.

* * * * *